(12) United States Patent
Pickens (10) Patent No.: US 11,867,084 B1
(45) Date of Patent: Jan. 9, 2024

(54) HOLLOW AIRFOIL CONSTRUCTION USING COVER SUBASSEMBLY

(71) Applicant: Raytheon Technologies Corporation, Farmington, CT (US)

(72) Inventor: John T. Pickens, Wethersfield, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/085,282

(22) Filed: Dec. 20, 2022

(51) Int. Cl.
*F01D 5/18* (2006.01)
*F02C 3/04* (2006.01)

(52) U.S. Cl.
CPC .................. *F01D 5/18* (2013.01); *F02C 3/04* (2013.01); *F05D 2230/232* (2013.01)

(58) Field of Classification Search
CPC ......... F01D 5/18; F02C 3/04; F05D 2230/232
See application file for complete search history.

(56) References Cited

U.S. PATENT DOCUMENTS

| | | | |
|---|---|---|---|
| 3,695,778 A * | 10/1972 | Taylor | F01D 5/147 416/241 A |
| 7,189,064 B2 | 3/2007 | Helder et al. | |
| 8,083,489 B2 * | 12/2011 | Viens | F04D 29/324 416/241 A |
| 9,221,120 B2 * | 12/2015 | Schwarz | F01D 5/147 |
| 9,855,628 B2 | 1/2018 | Radomski | |
| 10,215,027 B2 * | 2/2019 | Schwarz | F01D 5/147 |
| 10,502,064 B2 * | 12/2019 | Bales | B23K 15/0006 |
| 11,174,737 B2 * | 11/2021 | Dolan | B23K 20/129 |
| 11,639,685 B1 * | 5/2023 | Zheng | F01D 5/16 415/119 |
| 2010/0266415 A1 * | 10/2010 | Viens | F01D 5/147 416/233 |
| 2011/0211965 A1 * | 9/2011 | Deal | F02K 3/04 416/223 R |
| 2020/0300093 A1 * | 9/2020 | Drescher | B22F 10/20 |

* cited by examiner

*Primary Examiner* — Jesse S Bogue
(74) *Attorney, Agent, or Firm* — Carlson, Gaskey & Olds, P.C.

(57) ABSTRACT

A component for a gas turbine engine includes an airfoil having a plurality of channels with a main body extending between a leading edge and a trailing edge. The main body forms a portion of one side of the airfoil and the entirety of an opposing side of the airfoil. A cover is secured to the main body about a perimeter by a weld. The cover extends across a majority of the one side of the airfoil. A plurality of ribs extends from the cover in a direction toward the main body to define the channels. The ribs are secured to an inner surface of the main body by an adhesive. A gas turbine engine and a method are also disclosed.

15 Claims, 6 Drawing Sheets

HOLLOW AIRFOIL CONSTRUCTION USING COVER SUBASSEMBLY

BACKGROUND OF THE INVENTION

This application relates to a hollow airfoil and a method of forming such an airfoil.

Gas turbine engines are known, and typically include a fan delivering air into a bypass duct as propulsion air. The air is also fed into a compressor. Compressed air is delivered into a combustor where it is mixed with fuel and ignited. Products of this combustion pass downstream over turbine rotors, driving them to rotate.

One recent development in gas turbine engines is the use of a gear reduction between a fan drive turbine and the fan rotor. This slows the fan rotation speed down relative to the input speed from the fan drive turbine. With such a development the outer diameter of the fan blades has increased dramatically. The reduction of weight is a very important feature in the design of gas turbine engines. To reduce the weight of the fan blades, they have been formed to be generally hollow, with an outer cover welded over a hollow inner chamber of a fan blade body.

Another hollow airfoil application is compressor variable vanes. These vanes are positioned in front of rows of compressor rotor blades, and direct the air heading toward the compressor in a desired orientation. Such inlet vanes may be subject to icing, and thus it is known to form hollow cavities within the vanes to receive hot air for ice protection.

For that matter, compressor blades and turbine blades may also be formed to be hollow.

Hollow airfoils have used a range of manufacturing methods for bonding the cover to the body. As examples, diffusion bonding, welding, brazing and adhesives have all been proposed. Castings are also used to facilitate the hollow airfoil construction. However, diffusion bonding and castings have long lead times and typically high tool cost. Welding, brazing and adhesives have inspection issues that are challenging at "blind" locations. Further, such methods may result in material debits.

SUMMARY OF THE INVENTION

In a featured embodiment, a component for a gas turbine engine includes an airfoil having a plurality of channels with a main body extending between a leading edge and a trailing edge. The main body forms a portion of one side of the airfoil and the entirety of an opposing side of the airfoil. A cover is secured to the main body about a perimeter by a weld. The cover extends across a majority of the one side of the airfoil. A plurality of ribs extends from the cover in a direction toward the main body to define the channels. The ribs are secured to an inner surface of the main body by an adhesive.

In another embodiment according to the previous embodiment, the ribs and cover are formed integrally.

In another embodiment according to any of the previous embodiments, the ribs and cover are formed separately, and the ribs are brazed to the cover before being secured to the main body through the adhesive.

In another embodiment according to any of the previous embodiments, adhesive is also provided in one of the channels between a pair of the ribs, and on the inner surface of the main body.

In another embodiment according to any of the previous embodiments, the ribs have an enlarged surface at the inner surface of the main body.

In another embodiment according to any of the previous embodiments, the main body has enlarged bosses, and the ribs have a thin portion extending into a cavity formed in the bosses, with the adhesive deposited in the cavity.

In another featured embodiment, a gas turbine engine includes a fan for delivering air into a bypass duct and for delivering air into a compressor section. A combustor is downstream of the compressor section and a turbine section is downstream of the combustor section. The fan, the compressor section and the turbine section each include a plurality of components having airfoils. One type of the airfoils has a plurality of channels with a main body extending between a leading edge and a trailing edge. The main body forms a portion of one side of the airfoil and the entirety of an opposing side of the airfoil. A cover is secured to the main body about a perimeter by a weld. The cover extends across a majority of one side of the airfoil. A plurality of ribs extends from the cover in a direction toward the main body to define the channels the ribs being secured to an inner surface of the main body by an adhesive.

In another embodiment according to any of the previous embodiments, the ribs and cover are formed integrally.

In another embodiment according to any of the previous embodiments, the ribs and cover are formed separately, and the ribs are then brazed to the cover before being secured to the main body through the adhesive.

In another embodiment according to any of the previous embodiments, adhesive is also provided in one of the channels that extends between a pair of the ribs, and on the inner surface of the main body.

In another embodiment according to any of the previous embodiments, the ribs have an enlarged surface at the inner surface of the main body.

In another embodiment according to any of the previous embodiments, the main body has enlarged bosses, and the ribs have a thin portion extending into a cavity formed in the boss, with the adhesive deposited in the cavity.

In another embodiment according to any of the previous embodiments, the one type of the airfoils is fan blades.

In another embodiment according to any of the previous embodiments, the one type of the airfoils is variable vanes in the compressor section.

In another featured embodiment, a method of forming a hollow airfoil includes the steps of 1) forming a cover and rib subassembly having at least a plurality of ribs extending from the cover in a first direction, 2) depositing adhesive on an inner surface of a main body, 3) moving the subassembly such that the ribs move into contact with the adhesive to be secured to the main body, and 4) welding around a periphery of the cover to secure it to the main body after step 3).

In another embodiment according to any of the previous embodiments, an additive manufacturing technique is utilized to form at least one of the cover, ribs and main body.

In another embodiment according to any of the previous embodiments, the cover and ribs are formed integrally in step 1.

In another embodiment according to any of the previous embodiments, the ribs are formed separately from the cover and then secured to the cover as part of step 1).

In another embodiment according to any of the previous embodiments, the ribs are secured to the cover by a brazing process.

In another embodiment according to any of the previous embodiments, the main body includes enlarged bosses with a cavities receiving adhesive, and the ribs have a relatively thin portion moved into the channel in step 3).

The present disclosure may include any one or more of the individual features disclosed above and/or below alone or in any combination thereof.

These and other features of the present invention can be best understood from the following specification and drawings, the following of which is a brief description.

DETAILED DESCRIPTION

Figure 1:
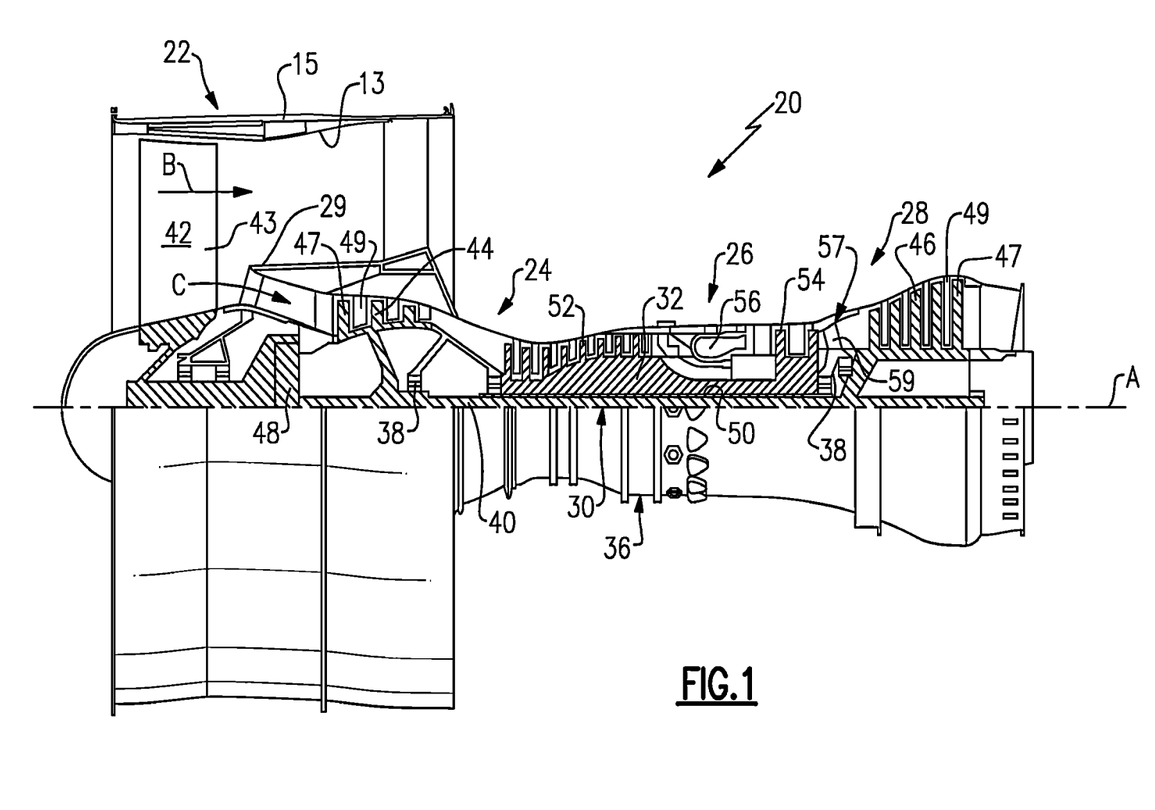
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. The engine 20 may incorporate a variable area nozzle for varying an exit area of the bypass flow path B and/or a thrust reverser for generating reverse thrust.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The fan 42 may have at least 10 fan blades 43 but no more than 20 or 24 fan blades 43. In examples, the fan 42 may have between 12 and 18 fan blades 43, such as 14 fan blades 43. An exemplary fan size measurement is a maximum radius between the tips of the fan blades 43 and the engine central longitudinal axis A. The maximum radius of the fan blades 43 can be at least 40 inches, or more narrowly no more than 75 inches. For example, the maximum radius of the fan blades 43 can be between 45 inches and 60 inches, such as between 50 inches and 55 inches. Another exemplary fan size measurement is a hub radius, which is defined as distance between a hub of the fan 42 at a location of the leading edges of the fan blades 43 and the engine central longitudinal axis A. The fan blades 43 may establish a fan hub-to-tip ratio, which is defined as a ratio of the hub radius divided by the maximum radius of the fan 42. The fan hub-to-tip ratio can be less than or equal to 0.35, or more narrowly greater than or equal to 0.20, such as between 0.25 and 0.30. The combination of fan blade counts and fan hub-to-tip ratios disclosed herein can provide the engine 20 with a relatively compact fan arrangement.

The low pressure compressor 44, high pressure compressor 52, high pressure turbine 54 and low pressure turbine 46 each include one or more stages having a row of rotatable airfoils. Each stage may include a row of vanes adjacent the rotatable airfoils. The rotatable airfoils are schematically indicated at 47, and the vanes are schematically indicated at 49.

The low pressure compressor 44 and low pressure turbine 46 can include an equal number of stages. For example, the engine 20 can include a three-stage low pressure compressor 44, an eight-stage high pressure compressor 52, a two-stage high pressure turbine 54, and a three-stage low pressure turbine 46 to provide a total of sixteen stages. In other examples, the low pressure compressor 44 includes a different (e.g., greater) number of stages than the low pressure turbine 46. For example, the engine 20 can include a five-stage low pressure compressor 44, a nine-stage high pressure compressor 52, a two-stage high pressure turbine 54, and a four-stage low pressure turbine 46 to provide a total of twenty stages. In other embodiments, the engine 20 includes a four-stage low pressure compressor 44, a nine-stage high pressure compressor 52, a two-stage high pressure turbine 54, and a three-stage low pressure turbine 46 to provide a total of eighteen stages. It should be understood that the engine 20 can incorporate other compressor and turbine stage counts, including any combination of stages disclosed herein.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above, and those in the next paragraph are measured at this condition unless otherwise specified.

"Fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The fan pressure ratio is a spanwise average of the pressure ratios measured across the fan blade 43 alone over radial positions corresponding to the distance. The fan pressure ratio can be less than or equal to 1.45, or more narrowly greater than or equal to 1.25, such as between 1.30 and 1.40. "Corrected fan tip speed" is the actual fan tip speed in ft/sec divided by an industry standard temperature correction of $[(Tram\ °R)/(518.7°\ R)]^{0.5}$. The corrected fan tip speed can be less than or equal to 1150.0 ft/second (350.5 meters/second), and can be greater than or equal to 1000.0 ft/second (304.8 meters/second).

The fan 42, low pressure compressor 44 and high pressure compressor 52 can provide different amounts of compression of the incoming airflow that is delivered downstream to the turbine section 28 and cooperate to establish an overall pressure ratio (OPR). The OPR is a product of the fan pressure ratio across a root (i.e., 0% span) of the fan blade 43 alone, a pressure ratio across the low pressure compressor 44 and a pressure ratio across the high pressure compressor 52. The pressure ratio of the low pressure compressor 44 is measured as the pressure at the exit of the low pressure compressor 44 divided by the pressure at the inlet of the low pressure compressor 44. In examples, a sum of the pressure ratio of the low pressure compressor 44 and the fan pressure ratio is between 3.0 and 6.0, or more narrowly is between 4.0 and 5.5. The pressure ratio of the high pressure compressor ratio 52 is measured as the pressure at the exit of the high pressure compressor 52 divided by the pressure at the inlet of the high pressure compressor 52. In examples, the pressure ratio of the high pressure compressor 52 is between 9.0 and 12.0, or more narrowly is between 10.0 and 11.5. The OPR can be equal to or greater than 45.0, and can be less than or equal to 70.0, such as between 50.0 and 60.0. The overall and compressor pressure ratios disclosed herein are measured at the cruise condition described above, and can be utilized in two-spool architectures such as the engine 20 as well as three-spool engine architectures.

The engine 20 establishes a turbine entry temperature (TET). The TET is defined as a maximum temperature of combustion products communicated to an inlet of the turbine section 28 at a maximum takeoff (MTO) condition. The inlet is established at the leading edges of the axially forwardmost row of airfoils of the turbine section 28, and MTO is measured at maximum thrust of the engine 20 at static sea-level and 86 degrees Fahrenheit (° F.). The TET may be greater than or equal to 2700.0° F., or more narrowly less than or equal to 3500.0° F., such as between 2750.0° F. and 3350.0° F. The relatively high TET can be utilized in combination with the other techniques disclosed herein to provide a compact turbine arrangement.

The engine 20 establishes an exhaust gas temperature (EGT). The EGT is defined as a maximum temperature of combustion products in the core flow path C communicated to at the trailing edges of the axially aftmost row of airfoils of the turbine section 28 at the MTO condition. The EGT may be less than or equal to 1000.0° F., or more narrowly greater than or equal to 800.0° F., such as between 900.0° F.

and 975.0° F. The relatively low EGT can be utilized in combination with the other techniques disclosed herein to reduce fuel consumption.

Figure 2A:
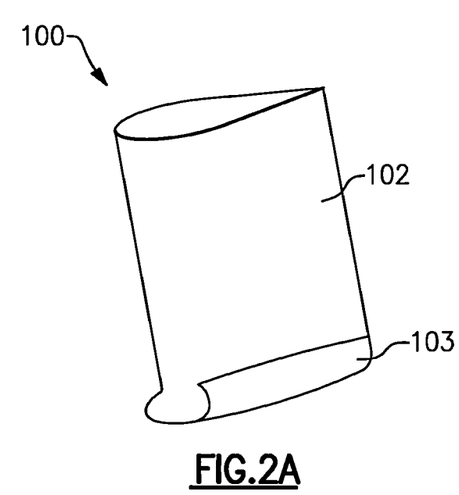
FIG. 2A schematically shows a fan blade.

FIG. 2A schematically shows a fan blade 100 as may be utilized in an engine such as the engine of FIG. 1. As known, fan blades have an airfoil 102 extending from mount structure 103.

Figure 2B:
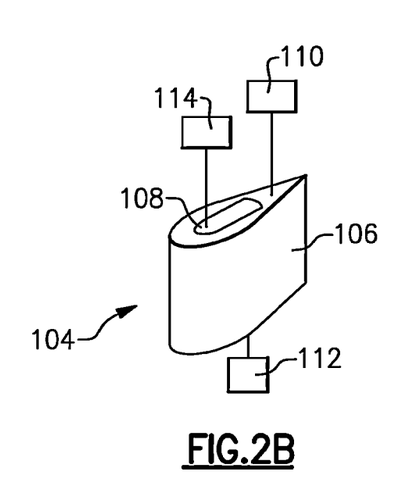
FIG. 2B schematically shows a variable inlet vane.

FIG. 2B schematically shows a variable vane 104 which may be utilized in a compressor section such as that shown in FIG. 1. A channel 108 receives hot air 114 from a source of hot air such as the compressor section. Some driving mechanism 110 (shown extremely schematically) is utilized to change the orientation of the airfoil 106. As known, a pivot mount 112 facilitates the pivoting movement of the airfoil 106.

While a fan blade and variable compressor vanes are disclosed, it should be understood that the teaching of this disclosure could extend to components having airfoils for other locations such as compressor blades, turbine vanes, and turbine blades.

Figure 3A:
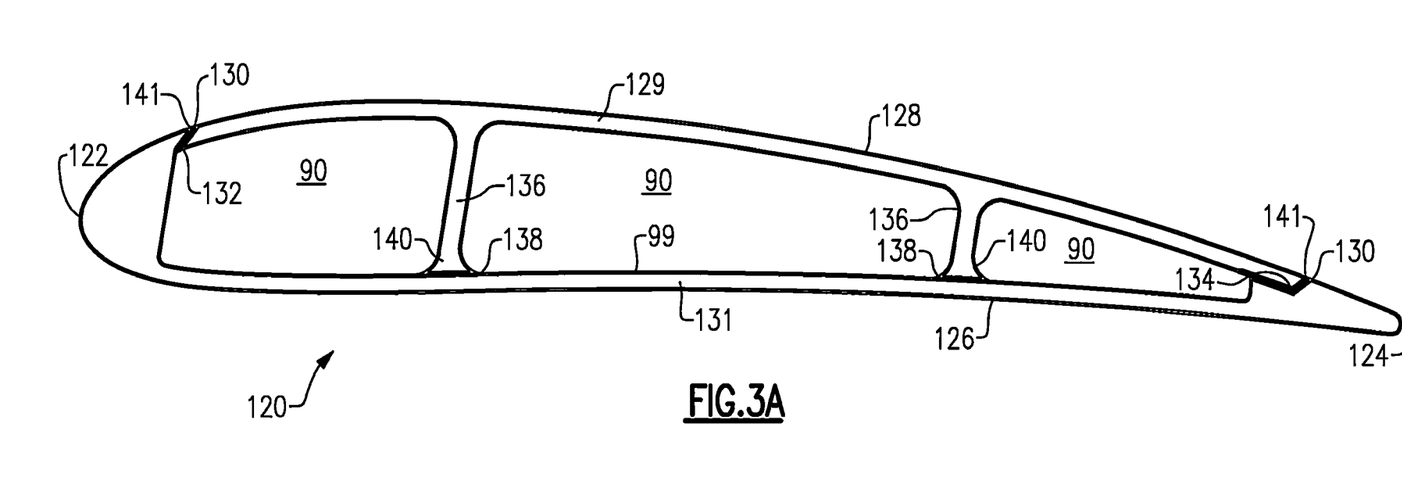
FIG. 3A shows a first airfoil embodiment which may be incorporated into the airfoils of the FIG. 2A fan or FIG. 2B variable vane.

As shown in FIG. 3A, a hollow airfoil 120 has a plurality of channels 90. The airfoil 120 extends from a leading edge 122 to a trailing edge 124. There is also a pressure wall 128 and a suction wall 126. The pressure wall 128 is generally formed by a cover 129 extending between ends 130 which are received within recesses 132 and 134 in an airfoil body 131. The leading edge 122 and trailing edge 124 are part of an airfoil body 131.

The cover 129 extends across a majority of one side of the airfoil, and the body 131 forms a portion of the one side of the airfoil and the entirety of an opposed side of the airfoil. A distance is defined between the leading edge and the trailing edge. The "majority of one side" could be defined as more than 50% of the distance.

It should be understood that the shape of the pressure and suction side of the airfoil will vary depending on the use of the airfoil. As an example, the pressure and suction sides of a fan blade look quite different compared to the pressure and suction sides of a turbine blade.

Structural ribs 136 extend from the cover 129 to sit against an inner surface 99 of the body 131. The ribs are secured to the inner surface 99 by an adhesive layer 138. The ribs 136 are formed with an enlarged base 140 at surface 99.

The adhesive may include any appropriate adhesive, including silicone rubber, epoxy, etc. The cover and body may be formed of nickel alloy steel in the case of the variable vane. In the fan blade the components may be formed of an appropriate titanium alloy.

Then, laser welding is applied to the joint 141 between the cover 129 and body 131.

Since the laser weld is only around the outer, visible joint 141 it will be easy to inspect. The adhesive layer 138 provides several benefits. As an example, it is more forgiving with regard to tolerance of the parts, and helps to avoid a requirement for tight tolerances.

In addition, the adhesive adds damping to the airfoil. The adhesive also increases the structural strength of the overall airfoil. Finally, the adhesive seals the several cavities 90 against airflow leakage.

As will be explained below, the disclosed embodiment also provides a significant reduction in lead time and the ability to make changes "on the fly" with regard to the design compared to the prior art methods.

Figure 3B:
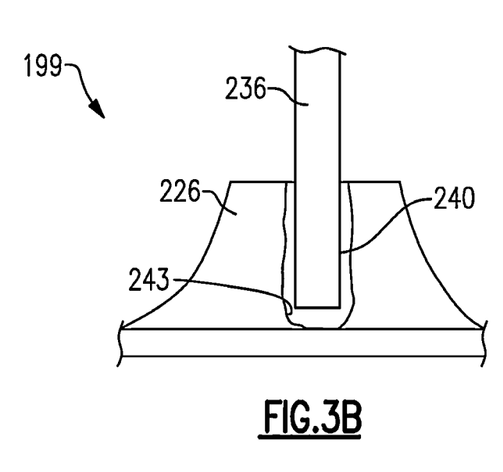
FIG. 3B shows an alternative embodiment to that of FIG. 3A.

FIG. 3B shows an embodiment 199. Here, one can see the ribs 236 have a thinner stand up portion extending into a cavity 243 in an enlarged boss 226 formed on the body 131. Another adhesive 240 is deposited into cavity 243.

Figure 4A:
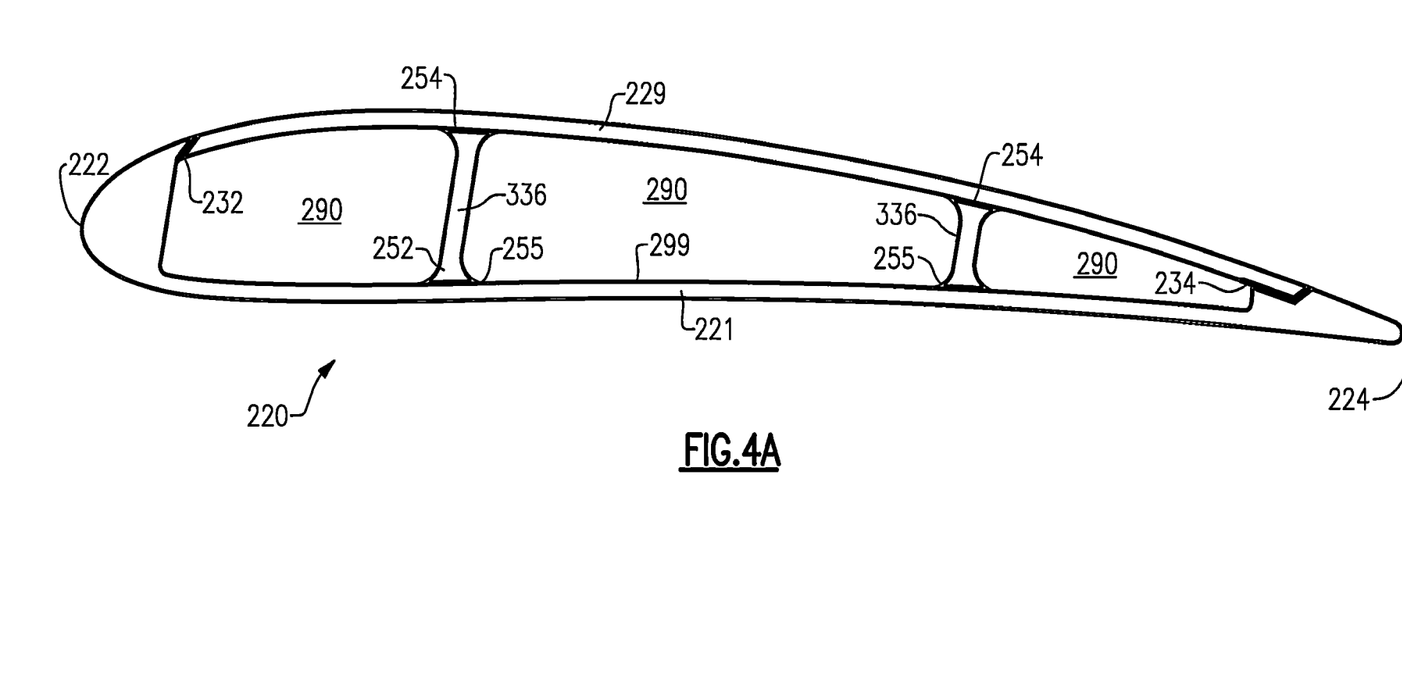
FIG. 4A shows yet another alternative embodiment airfoil.

FIG. 4A shows yet another embodiment 220. The embodiment 220 has much of the same structure as the embodiments of FIGS. 3A and 3B. Thus, elements which are the same are repeated here only with adding the numeral 2 before the numbers used in FIG. 3A. Here, however, the ribs 336 are not formed integrally with the cover 229. Instead, the ribs 336 are brazed at 254 to the cover 229 and again secured by adhesive 255 to the body 221.

Figure 4B:
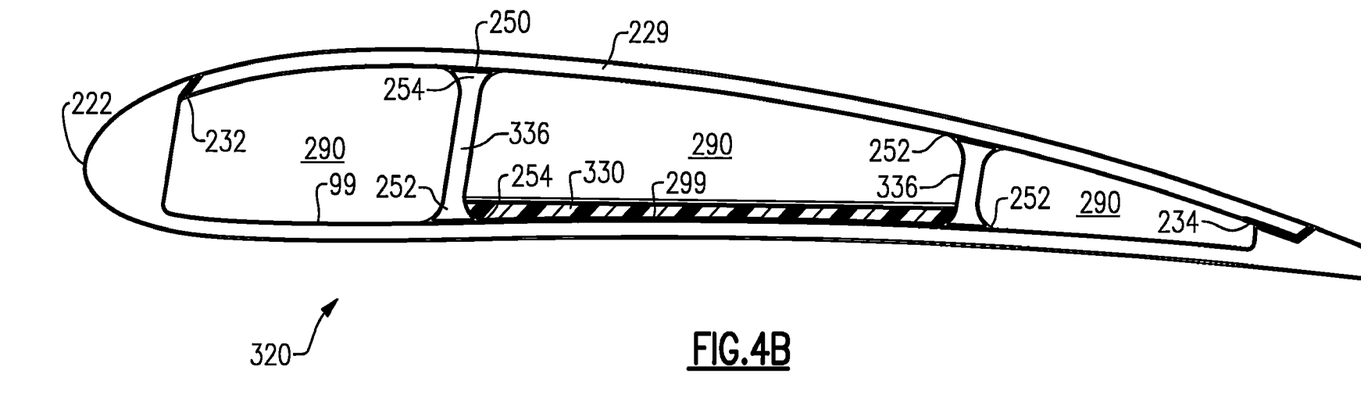
FIG. 4B shows yet another alternative embodiment airfoil.

FIG. 4B shows yet another embodiment 320 which is similar to the embodiment of FIG. 4A. However, there is an intermediate adhesive layer 330 extending between the ribs 436 and through one of the cavities 290. This will provide improved sealing between the adjacent cavities 290.

Figure 4C:
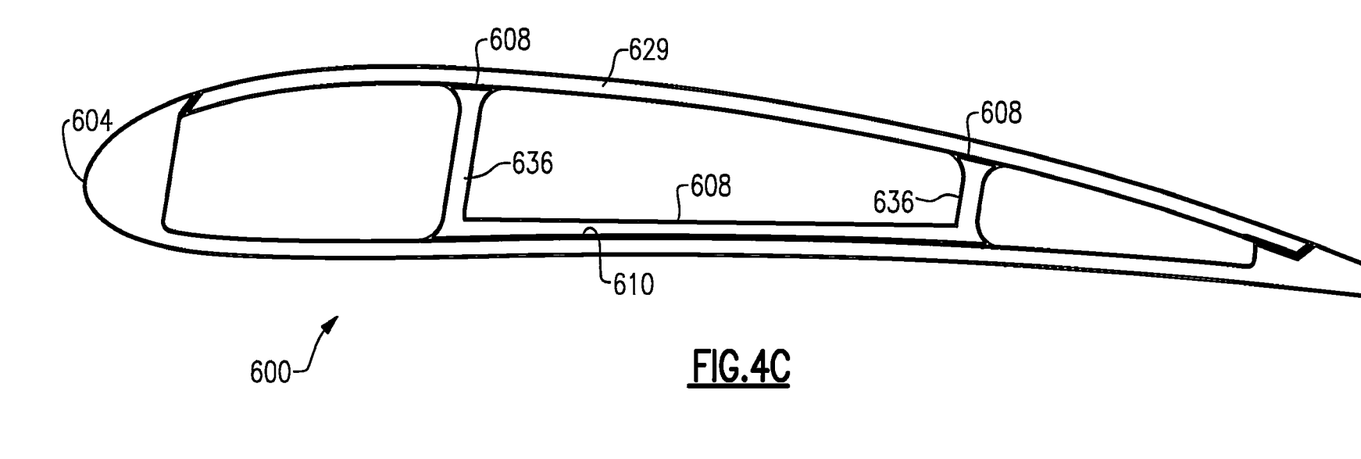
FIG. 4C shows yet another alternative embodiment airfoil.

FIG. 4C shows yet another embodiment 600 wherein the cover 629 is again secured to the body 604. The ribs 606 are connected by a base 608. The ribs 606 are initially brazed at 608 to the cover 602. Then, the base 608 and ribs 636, along with the cover 602 are secured as a subassembly to the body 604 through an adhesive layer 610.

Figures 5A, 5B:
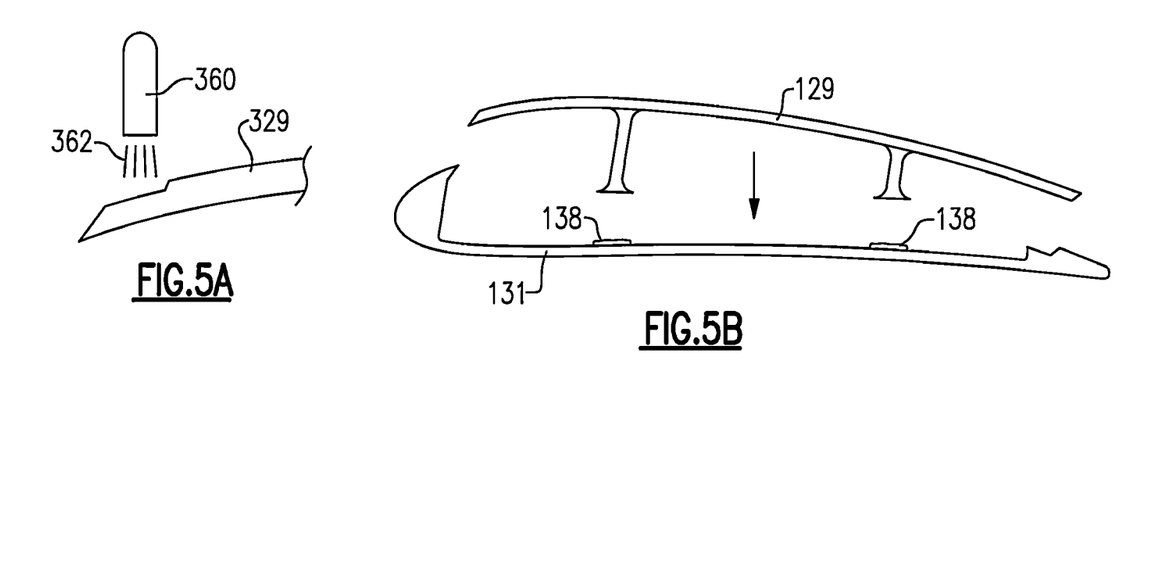
FIG. 5A shows a first step in forming an airfoil such as shown in the earlier Figures.
FIG. 5B shows a subsequent step to that of FIG. 5A.

FIG. 5A shows a first alternative step in forming airfoils according to any of the above disclosed embodiments. What is to be a cover 329 is being formed by an additive manufacturing tool 360 which is depositing material 362 to form the intermediate cover 329. A similar method could be utilized to form the airfoil bodies according to any of the above embodiments.

One particular additive manufacturing technique is direct material laser sintering, however, other additive manufacturing techniques may be utilized. The use of such techniques reduces the lead time associated with using diffusion bonding or casting. Moreover, if changes need to be made to geometries due to learning during manufacturing or testing, these changes can be made with little or no changes to tooling.

FIG. 5B shows a subsequent step. Here, a subassembly of the cover and ribs is shown being moved into contact with the body 131. The adhesive 138 has already been deposited.

Figure 5C:
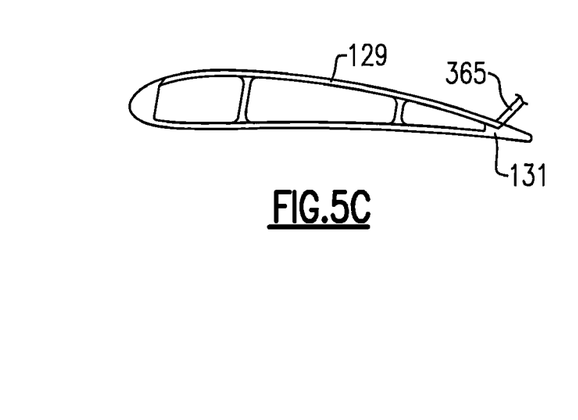
FIG. 5C shows yet another subsequent step.

FIG. 5C shows a subsequent step. Now, the cover 129 is sitting against the body 131. A laser weld tool 365 is applying a weld joint at the joint between the cover 129 and body 131.

Figure 5D:
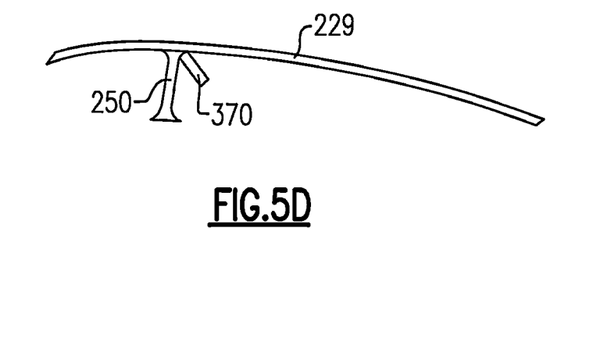
FIG. 5D shows an optional step which would be utilized to form the embodiments of FIG. 4A or 4B prior to step 5B.

FIG. 5D shows a step which might be intermediate FIGS. 5A and 5B for the FIGS. 4A and 4B embodiments. A brazing tool 370 is brazing a rib 250 to the cover 229. The other rib 250 would then be brazed to the cover 229 and the subassembly moved into contact with the body 131.

Subsequent to the FIG. 5C step, local stress relief may be provided to the weld joint around the perimeter such as by heating the airfoil. The heating temperature and location, should be selected so as to not damage the adhesive bonds. Actively cooling the bonding area during weld and subsequent stress relieve can also prevent damaging the bonds. Lastly, the configuration can be modified so that the adhesive bonds are applied after the welding and stress relief.

A component for a gas turbine engine under this disclosure could be said to include an airfoil having a plurality of channels with a main body extending between a leading edge and a trailing edge. The main body forms a portion of one side of the airfoil and the entirety of an opposing side of the airfoil. A cover is secured to the main body about a perimeter by a weld. The cover extends across a majority of the one side of the airfoil. A plurality of ribs extending from the cover in a direction toward the main body to define the channels. The ribs are secured to an inner surface of the main body by an adhesive.

A gas turbine engine comprising under this disclosure could be said to include a fan for delivering air into a bypass duct and for delivering air into a compressor section. A combustor is downstream of the compressor section and a turbine section is downstream of the combustor section. The fan, the compressor section and the turbine section each include a plurality of components having airfoils. One type of the airfoils has a plurality of channels with a main body extending between a leading edge and a trailing edge. The main body forming a portion of one side of the airfoil and the entirety of an opposing side of the airfoil. A cover is secured to the main body about a perimeter by a weld. The cover extends across a majority of one side of the airfoil. A plurality of ribs extending from the cover in a direction toward the main body to define the channels. The ribs are secured to an inner surface of the main body by an adhesive.

A method of forming a hollow airfoil under this disclosure could be said to include the steps of 1) forming a cover and rib subassembly having at least a plurality of ribs extending from the cover in a first direction, 2) depositing adhesive on an inner surface of a main body, 3) moving the subassembly such that the ribs move into contact with the adhesive to be secured to the main body, and 4) welding around a periphery of the cover to secure it to the main body after step 3).

While embodiments have been disclosed, a worker of ordinary skill in this art would recognize that certain modifications would come within the scope of this disclosure. For that reason, the following claims should be studied to determine the true scope and content of this disclosure.

What is claimed is:

1. A component for a gas turbine engine comprising:
   an airfoil having a plurality of channels with
   (i) a main body extending between a leading edge and a trailing edge, said main body forming a portion of one side of the airfoil and the entirety of an opposing side of the airfoil;
   (ii) a cover secured to said main body about a perimeter by a weld, said cover extending across a majority of the one side of the airfoil; and
   (iii) a plurality of ribs extending from the cover in a direction toward the main body to define the channels, said ribs being secured to an inner surface of the main body by an adhesive; and wherein said main body has enlarged bosses, and said ribs have a thin portion extending into a cavity formed in said bosses, with the adhesive deposited in said cavity.

2. The component as set forth in claim 1, wherein the ribs and cover are formed integrally.

3. The component as set forth in claim 1, wherein the ribs and cover are formed separately, and the ribs are brazed to the cover before being secured to the main body through the adhesive.

4. The component as set forth in claim 1, wherein adhesive is also provided in one of said channels between a pair of said ribs, and on said inner surface of said main body.

5. A gas turbine engine comprising:
   a fan for delivering air into a bypass duct and for delivering air into a compressor section;
   a combustor downstream of the compressor section and a turbine section downstream of the combustor section;
   the fan, the compressor section and the turbine section each including a plurality of components having airfoils;
   one type of said airfoils having a plurality of channels with
   (i) a main body extending between a leading edge and a trailing edge, said main body forming a portion of one side of the airfoil and the entirety of an opposing side of the airfoil;
   (ii) a cover secured to said main body about a perimeter by a weld, said cover extending across a majority of one side of the airfoil; and
   (iii) a plurality of ribs extending from the cover in a direction toward the main body to define the channels said ribs being secured to an inner surface of the main body by an adhesive; and wherein said main body has enlarged bosses, and said ribs have a thin portion extending into a cavity formed in said bosses, with the adhesive deposited in said cavity.

6. The gas turbine engine as set forth in claim 5, wherein the ribs and cover are formed integrally.

7. The gas turbine engine as set forth in claim 5, wherein the ribs and cover are formed separately, and the ribs are then brazed to the cover before being secured to the main body through the adhesive.

8. The gas turbine engine as set forth in claim 5, wherein adhesive is also provided in one of said channels that extends between a pair of said ribs, and on said inner surface of said main body.

9. The gas turbine engine as set forth in claim 5, wherein said one type of the airfoils is fan blades.

10. The gas turbine engine as set forth in claim 5, wherein said one type of the airfoils is variable vanes in the compressor section.

11. A method of forming a hollow airfoil comprising the steps of:
    1) forming a cover and rib subassembly having at least a plurality of ribs extending from the cover in a first direction;
    2) depositing adhesive on an inner surface of a main body;
    3) moving the subassembly such that the ribs move into contact with the adhesive to be secured to the main body; and
    4) welding around a periphery of the cover to secure it to the main body after step 3); and wherein the main body includes enlarged bosses with a cavities receiving adhesive, and the ribs have a relatively thin portion moved into the cavity in step 3).

12. The method as set forth in claim 11, wherein an additive manufacturing technique is utilized to form at least one of the cover, ribs and main body.

13. The method as set forth in claim 11, wherein the cover and ribs are formed integrally in step 1.

14. The method as set forth in claim 11, wherein the ribs are formed separately from the cover and then secured to the cover as part of step 1).

15. The method as set forth in claim 14, wherein the ribs are secured to the cover by a brazing process.

* * * * *